UNITED STATES PATENT OFFICE.

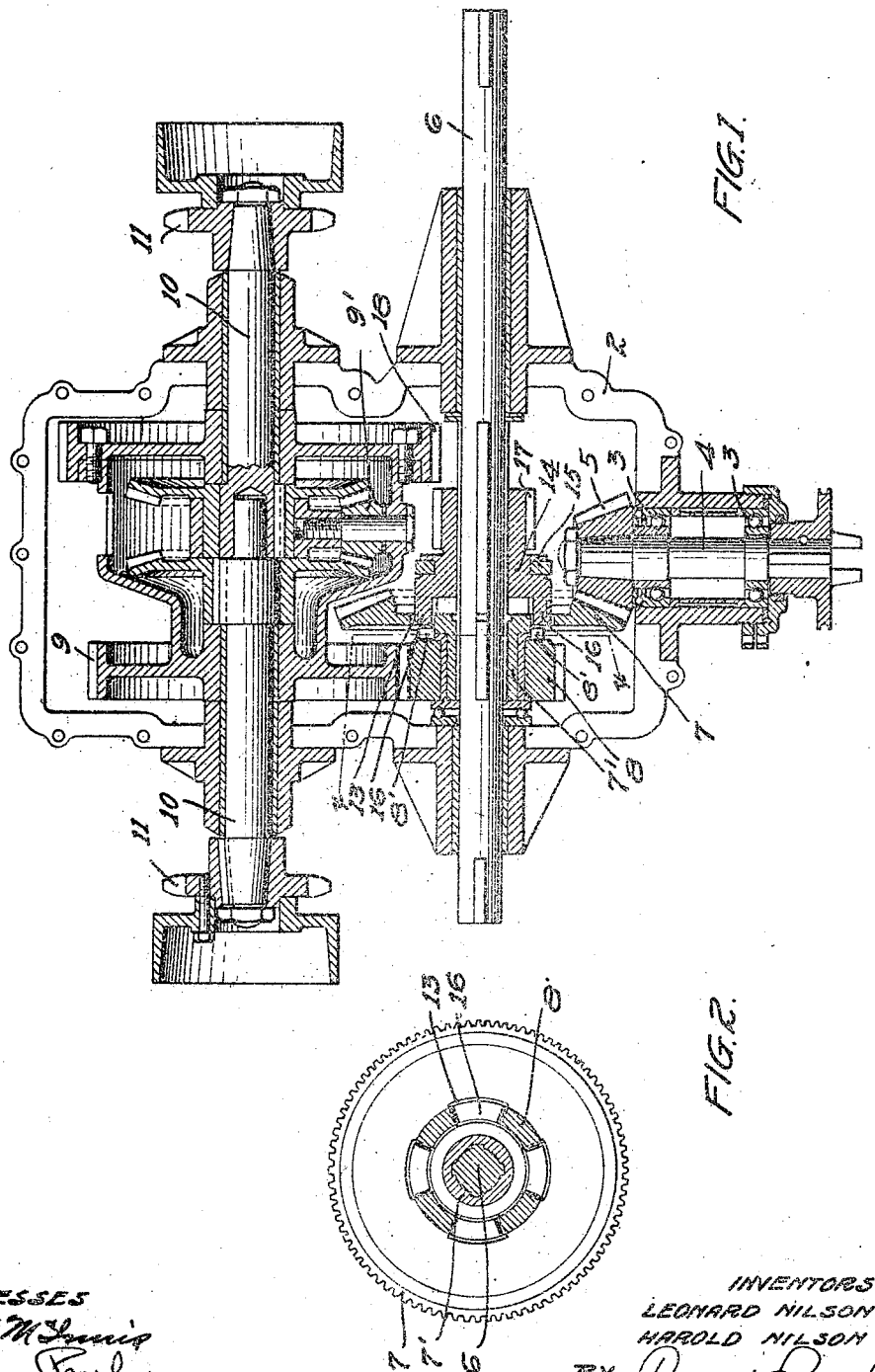

LEONARD NILSON AND HAROLD NILSON, OF WAYZATA, MINNESOTA.

TRANSMISSION-GEARING.

1,193,591.  Specification of Letters Patent.  Patented Aug. 8, 1916.

Application filed November 23, 1915. Serial No. 63,020.

*To all whom it may concern:*

Be it known that we, LEONARD NILSON and HAROLD NILSON, citizens of the United States, residents of Wayzata, county of Hennepin, State of Minnesota, have invented certain new and useful Improvements in Transmission-Gearing, of which the following is a specification.

The object of our invention is to provide a simple, compact gearing which can be assembled in a smaller space than gearings of this kind as usually constructed.

A further object is to provide a transmission gearing capable of convenient operation and easily accessible.

Other objects of the invention will appear from the following detailed description.

The invention consists generally in various constructions and combinations, all as hereinafter described and particularly pointed out in the claims.

In the accompanying drawings forming part of this specification, Figure 1 is a sectional view through a transmission gearing embodying our invention, Fig. 2 is a detail sectional view on the line $x$—$x$ of Fig. 1.

In the drawing, 2 represents a suitable housing of ordinary construction, having bearings 3 for a drive shaft 4 on which is mounted a driving pinion 5.

6 is a transmission gearing shaft mounted in bearings in the housing at right angles, substantially, to the shaft 4. A gear 7 having a hub 7' is keyed on said shaft 6 and a pinion 8 is loosely mounted on the hub of said gear and meshes with a gear of a differential 9' of usual construction having shafts 10 that are provided with sprockets 11 for connection with the rear wheels of the vehicle in which the transmission gearing is mounted. The beveled gear 7 on the shaft 6 meshes with the pinion 5 and is provided with a series of openings 13 in its web. A hub 14 is splined on the shaft 6, being movable back and forth thereon through the clutch arms 15 in the usual way, and one end of said hub is provided with a series of lugs 16 in position to enter the openings 13 and engage the teeth 8' of the pinion 8 for the purpose of transmitting power from the shaft 6 through the pinion 8 to the gear 9. A pinion 17 is provided at the other end of the hub 14 in position to mesh with a gear 18 when the hub is moved in the other direction. These gears 9 and 18 are connected with the differential 9' that is provided with the shafts 10 and being of ordinary construction, requires no detailed description or illustration.

When the hub 14 is in the position shown in Fig. 1, the gear will be neutral and the pinion 5 will drive the beveled gear 7 without transmitting power to the shafts 10. When, however, the pinion 17 is moved into mesh with the gear 18 of the differential, the power will be transmitted through these gears to the shafts 10 at slow speed and when the hub 14 is moved in the other direction, the lugs 16 will pass through the holes 13 and meshing with the teeth 8' of the pinion 8 will drive it and the gear 9 of the differential and the shafts 10 at a faster speed. In this way we are able to obtain two speeds in one direction through the movement of a single hub and pinion.

We claim as our invention:

1. A transmission gearing comprising a transmission shaft, a gear mounted thereon having holes in its web, a pinion loosely mounted on said gear and having teeth in one end thereof, a pinion splined on said transmission shaft and having lugs to enter said holes and engage the teeth of said loosely mounted pinion for one speed, and a gear mounted to mesh with the teeth of said splined pinion for another speed.

2. In a transmission gearing, a shaft, a loosely mounted pinion, a driving gear secured on said shaft and having holes in its web, a pinion splined on said shaft and having means for engagement with the teeth of said loosely mounted pinion through the holes of said driving gear, for the purpose specified.

3. In a transmission gearing, a shaft, a driving gear secured thereon, transmission gears mounted upon opposite sides of said driving gear and a transmission pinion mounted to move into engagement with the transmission gear on one side of said driving gear for one speed and through said driving gear into mesh with the transmission gear on the other side of said driving gear for another speed.

In witness whereof, we have hereunto set our hands this 15th day of November, 1915.

LEONARD NILSON.
HAROLD NILSON.